United States Patent [19]

Majumdar et al.

[11] Patent Number: 5,503,940
[45] Date of Patent: Apr. 2, 1996

[54] ELASTOMERIC LAMINATES CONTAINING A SOLVENTLESS ELASTOMERIC ADHESIVE COMPOSITION

[75] Inventors: Ramendra N. Majumdar, Hudson; Thomas E. Duncan, Akron; Richard M. D'Sidocky, Ravenna; James R. Herberger, Sr., Canal Fulton; Lewis T. Lukich, Akron; Becky G. Dunn, Stow, all of Ohio

[73] Assignee: The Goodyear Tire & Rubber Company, Akron, Ohio

[21] Appl. No.: 327,776

[22] Filed: Oct. 24, 1994

[51] Int. Cl.$^6$ ........................................................ B60C 9/13
[52] U.S. Cl. ........................ 428/492; 428/500; 428/494; 428/501; 428/506; 428/515; 428/519; 152/565
[58] Field of Search ................... 152/565; 428/492, 428/494, 500, 501, 506, 515, 519

[56] References Cited

U.S. PATENT DOCUMENTS

| | | | |
|---|---|---|---|
| 3,335,041 | 8/1967 | Osborne | 156/110 |
| 3,342,238 | 9/1967 | Weinstock et al. | 152/330 |
| 3,421,565 | 1/1969 | Reinbold | 152/330 |
| 4,463,120 | 7/1984 | Collins et al. | 524/274 |
| 4,518,733 | 5/1985 | Ishikawa et al. | 524/274 |
| 4,756,782 | 7/1988 | Seiberling | 156/96 |
| 4,803,250 | 2/1989 | Nagasaki et al. | 525/329.3 |
| 5,063,268 | 11/1991 | Young | 524/286 |
| 5,328,636 | 7/1994 | Maly et al. | 252/182.17 |

FOREIGN PATENT DOCUMENTS

| | | |
|---|---|---|
| WO 92/07904 | 5/1992 | European Pat. Off. . |
| WO 93/09178 | 5/1993 | European Pat. Off. . |
| 1235026 | 6/1971 | United Kingdom . |

OTHER PUBLICATIONS

An article entitled: IRC '85 Kyoto: Int'l Rubber conference Proceedings, Kyoto, Japan, Oct. 15–18, 1985, Corporate Edition: Japan Soc. of Rubber Industry, pp. 875–880.

A publication in the Rubber Chemicals Technical Bulletin entitled "Perkalink® 900 Reversion Resistance by Crosslink Compensation" published by Akzo Nobel, 21 pages, Publication 94–110, Aug., 1994.

*Primary Examiner*—W. Robinson Clark
*Attorney, Agent, or Firm*—Henry C. Young, Jr.

[57] ABSTRACT

An elastomeric adhesive composition or cushion which binds various elastomeric layers together is solventless and comprises a blend of a bis-imide compound, one or more elastomers, and a tackifier. The elastomeric adhesive has strong blowout protection and can be utilized to form a laminate of a buffed cured tire carcass carcass to a cured or uncured tire tread.

10 Claims, 1 Drawing Sheet

ELASTOMERIC LAMINATES CONTAINING A SOLVENTLESS ELASTOMERIC ADHESIVE COMPOSITION

FIELD OF THE INVENTION

The present invention relates to elastomeric laminates containing an adhesive composition or cushion layer which has excellent blowout protection. More specifically, the adhesive cushion comprises a blend of bis-imides, elastomeric compounds, and tackifiers.

BACKGROUND OF THE INVENTION

Heretofore, adhesive compositions commercially utilized for adhering various elastomer components to one another have generally contained solvents therein. Although some formulations may not contain any solvents, they nevertheless had poor blowout resistance when cured.

SUMMARY OF THE INVENTION

The invention relates to a solventless elastomeric adhesive composition or cushion material useful for adhering or binding various elastomeric layers such as in tire retreading, splicing and the like. The solventless adhesive composition includes a mixture of at least one elastomer, at least one tackifier, and at least one bis-imide compound of the general formula:

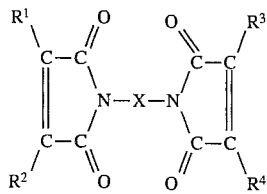

where $R^1$, $R^2$, $R^3$, and $R^4$, independently are hydrogen, an alkyl group having from 1 to 5 carbon atoms, a phenyl group, an alkylphenyl group having 7 to 10 carbon atoms or a halogen substituted alkyl group having from 1 to 5 carbon atoms, a halogen substituted phenyl group, or a halogen substituted alkylphenyl group having a total of from 7 to 10 carbon atoms, and where X is an alkylene group having from 1 to 5 carbon atoms, a phenylene group, an alkylphenylene or alkylenephenyl group having 7 to 10 carbon atoms or a halogen substituted alkylene having from 1 to 5 carbon atoms, a halogen substituted phenylene group, or a halogen substituted alkylphenylene or alkylenephenyl group having a total of from 7 to 10 carbon atoms.

The present invention advantageously provides an elastomeric adhesive composition which is free of solvent before its application and which has improved blowout protection.

DETAILED DESCRIPTION OF THE INVENTION

Figure 1:
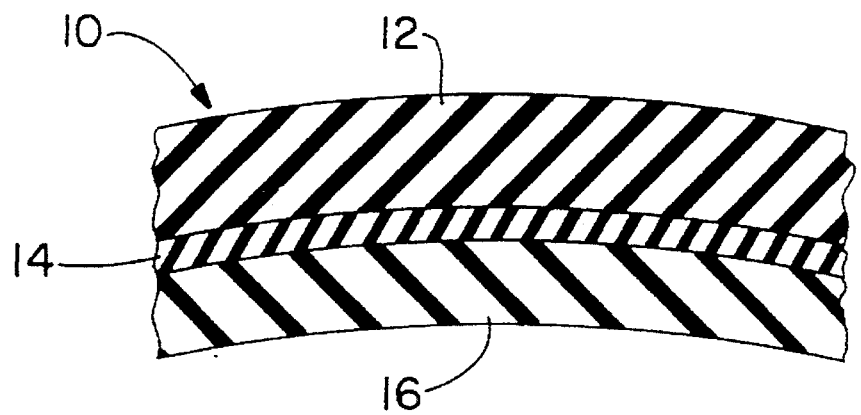
FIG. 1 is a partial side elevation of a schematic cross section of a laminate in the form of a retreaded tire prepared according to the present invention.

According to an embodiment of the present invention, a laminate in the form of a retreaded tire 10 comprises a cured or uncured tread of retread stock 12 adhered directly to a cured tire carcass 16 by a solventless elastomeric adhesive composition in the form of an adhesive cushion layer 14.

The retread stock or tread stock 12 is well known to the art and can be any cured or uncured conventional rubber such as rubbers made from conjugated dienes having from 4 to 10 carbon atoms (e.g. polybutadiene, polyisoprene, natural rubber, etc.), rubbers made from conjugated diene monomers having from 4 to 10 carbon atoms with vinyl substituted aromatic monomers having from 8 to 12 carbon atoms (e.g., styrene-butadiene rubber), and the like, as well as blends thereof. Such rubbers generally contain various antioxidants, fillers such as carbon black, oils, sulfur, accelerators, antioxidants, stearic acid, antiozonants and the like in conventional amounts.

The cured carcases compounds are well known to the art and literature and generally include a variety of synthetic rubbers, natural rubber or blends thereof. Illustrative examples include rubbers made from conjugated dienes, such as polyisoprene or natural rubber, rubbers made from conjugated dienes having from 4 to 12 carbon atoms and vinyl substituted aromatics having from 8 to 12 carbon atoms, such as styrene-butadiene rubber, and the like, as well as blends thereof. Such rubbers are generally compounded with oil, fillers such as carbon black, processing aids, zinc oxide, stearic acid, sulfur, accelerators, antioxidants, antiozonants and the like in conventional amounts.

The adhesive composition or cushion layer is prepared from a solventless adhesive composition which comprises at least one elastomer and at least a compound of the general formula:

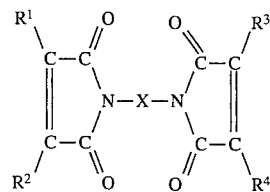

where $R^1$, $R^2$, $R^3$, and $R^4$, independently, and X is as defined hereinabove. For the sake of brevity such compounds will hereafter be referred to as bis-imides.

An example of a bis-imide that is particularly preferred for use in the invention is N,N'-m-xylylene bis-citraconic imide (Perkalink® 900 manufactured by Akzo), which has the following structural formula:

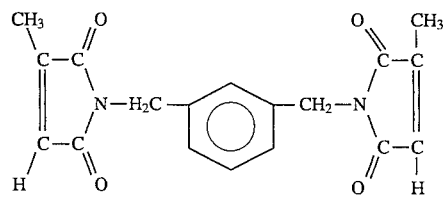

Another suitable bis-imide compound is N,N'-m-phenylene bismaleimide (HVA-2® manufactured by DuPont) which has the structural formula:

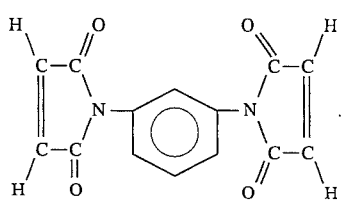

Still another suitable bis-imide compound is 1,1'(methylenedi-4,1-phenylene) bismaleimide (BM, available from Aldrich) which has the structural formula:

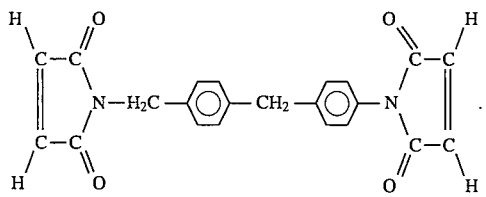

The bis-imide compounds are used in an amount which is effective to achieve improved blowout resistance, reduced heat generation, improved durability, or reduced reversion or to achieve a combination of enhanced properties. Suitable amounts of a bis-imide compound are generally at least 0.1 or 0.2, desirably from about 0.3 to about 5 or 10, and preferably from about 0.5 to about 2 parts by weight per 100 parts by weight of the elastomer (phr) in the elastomeric adhesive composition.

Suitable elastomers which can be used in preparing the solventless elastomeric adhesive composition of the present invention include natural rubber and various synthetic elastomers as well as various blends thereof. Examples of synthetic rubber which can be used in the solventless adhesive composition or cushion layer include copolymers of conjugated dienes having from 4 to about 7 carbon atoms and vinyl substituted aromatic compounds having from 8 to about 12 carbon atoms, such as styrene-butadiene rubbers; polymers and copolymers of conjugated dienes having from 4 to 7 carbon atoms, such as natural rubber (i.e., cis-1,4-polyisoprene), polybutadiene and polyisoprene; polychloroprene (neoprene rubber); and the like; as well as various blends thereof. Especially preferred are blends containing from about 20 to about 80 percent by weight of natural rubber and from about 80 to about 20 percent by weight of polybutadiene based upon the total weight of the elastomers in the adhesive composition.

In addition to the elastomeric component and the bis-imide compound, the adhesive compositions of the invention can include one or more compatible tackifying agents which are utilized in an effective amount to promote good adhesion with both vulcanized elastomeric substrates and with uncured, vulcanizable elastomeric substrates (i.e. non-vulcanized or at least substantially non-vulcanized). Various tackifying resins can be utilized which are generally well known to the art and to the literature. These resins generally include rosin and its derivatives and various hydrocarbon resins. The rosin group comprises rosins, modified rosins and their various derivatives such as esters. The hydrocarbon resin group comprises polyterpines, synthetic hydrocarbon resins, and various modified or special resins which are primarily phenolics. Examples of specific rosin tackifiers include gum rosin, wood rosin, tall oil rosin, and the like. Such rosins are generally a mixture of organic acids called rosin acids. Minor components in the rosin resin include rosin esters and anhydrides, unsaponifiable matter, and fatty acids. The rosin acids can be divided into two different groups, abietic acid type and primaric acid type. The various rosin acids can be reacted with a variety of alcohol to form esters. Examples of specific rosin resin tackifiers include glycerine rosin ester, e.g., Floral 85, manufactured by Hercules, Inc.; hydrogenated pentaerythritol ester, e.g., Pentalyn H, manufactured by Hercules, Inc.; hydrogenated glycerine ester, e.g., Staybelite Ester 10, manufactured by Hercules, Inc.; modified tall oil rosin, e.g., Sylvatac RX, manufactured by Sylvachem Corp.; polymerized rosin such as Sylvatac 95, manufactured by Sylvachem Corp., and rosin ester such as Zonester 85, manufactured by Arizona Chemical Co.

Hydrocarbon tackifier resins are low molecular weight polymers derived from crude monomer streams. Steams can be obtained from wood, coal, or petroleum sources. Hydrocarbon resin streams can be classified as containing primarily aromatic, aliphatic, and diene (cyclic olefin) monomers. Polymerization of such streams is generally carried out using a Lewis acid catalyst or by a free-radical process using heat and pressure. The aromatic hydrocarbon resins generally contain aromatic petroleum resins and resins from coal tar, commonly called coumarone-indene resins. The various aliphatic hydrocarbon resins are produced from light, so called carbon-5 petroleum fractions wherein the principal monomers are cis and trans-piperylene. Other hydrocarbon resins include mixed aliphatic-aromatic resins as well as terpene resins.

The above tackifier resins are described in more detail in the Handbook of Pressure-Sensitive Adhesive Technology, edited by Donatas Satas, Van Nostrand Reinhold Company, 1982, Chapter 16, pages 353–369, which is hereby fully incorporated by reference.

Another and preferred type of tackifier are the various phenol-formaldehyde resins. Such resins generally have a number average molecular weight of 2,000 or less. Typically, alkyl phenols are used rather than phenol itself Since the alkyl group improves the miscibility of the resin with the rubber. Thus, alkyl groups having from 1 to 15 carbon atoms such as butyl, octyl, and nonyl, have been attached to the phenolic nucleus. The manufacture of phenolic resins generally include the condensation of the alkyl phenol with formaldehyde to produce the phenolic resins. Since the phenol has three reactive positions, it will form insoluble resins when more than one mole of formaldehyde is used per mole of phenol. When low ratios of formaldehyde are used, tackifiers are formed. The existence of phenol-formaldehyde tackifiers are well known to the art and to the literature, e.g., "Resins Used in Rubbers" by Paul O. Powers, Rubber Chemistry and Technology, Vol. 36, pages 1542–1562, (1963), and "Role of Phenolic Tackifiers in Polyisoprene Rubber," by F. L. Mangus and G. R. Hamed, Rubber Chemistry and Technology, vol. 64, pages 65–73 (1991). The amount of tackifying agent is typically in the range from about 1 to about 30, desirably from about 2 to about 15, and preferably from about 6 to 10 phr.

The elastomeric adhesive compositions or cushions of the present invention can include one or more reinforcing agents or fillers in an amount of from about 5 to 100 phr. Examples of such materials include carbon black, silica in combination with an appropriate coupling agent, and the like. Carbon black is preferred and is desirably used in an amount from about 20 to about 70 and preferably from about 40 to about 55 phr. Generally, any conventional carbon black is suitable for use in the practice of this invention. Preferably, the carbon black has an average mean particle diameter less than 285 nm, and preferably less than 60 nm such as in grades N550, N330, and the like (ASTM-D-3849).

The present invention relates to sulfur cure systems and include one or more cure accelerators. Suitable amounts of sulfur and/or sulfur donor-type compounds generally range from about 1 to about 6 and preferably from about 2 to about 4 phr. The amounts of sulfur vulcanization accelerator generally range from about 0.2 to about 4 and preferably from about 0.5 to about 2.0 phr. Various sulfur accelerators can be used such as aldehyde-amine accelerators, e.g., the reaction product of butyraldehyde and aniline, amines such as hexamethylene tetramine, guanidines such as diphenyl guanidine, thioureas, sulfenamides, and the like. Activators such as zinc oxide, stearic acid, litharge, magnesia and amines can be also be used in conventional amounts to attain good crosslinking efficiency, such as in amounts of from about 0.5 to about 12 and preferably from about 1 to about 5 or 10 phr. Various oils such as napthenic oils are commonly utilized in suitable amounts such as from about 1 to about 30 and desirably from about 4 to about 20 phr.

The solventless adhesive compositions of the invention can also include conventional amounts of various known rubber compounding ingredients such as processing aids, stabilizers antidegradants and the like. Suitable antioxidants include hindered phenols, amines, amino phenols, hydroquinones, alkyldiamines, amine condensation products and the like.

An important aspect of the present invention is that the elastomeric adhesive composition has a built-in or an inherent adhesive property and thus can be applied without the need of any solvent or other adhesive composition. That is, the elastomeric adhesive compositions of the present invention are free of solvent, although they can be applied with solvent followed by evaporation of the solvent. However, for economic or environmental factors, solvents are not recommended. Another important aspect is that the solventless elastomeric adhesive composition in the uncured state has excellent pressure sensitive tack to both uncured and to cured rubber. Hence, it can be applied wrinkle-free to a buffed carcass, etc.

The uncured elastomeric adhesive composition of the present invention can be vulcanized by heat or radiation according to any conventional vulcanization process. Typically, the vulcanization is conducted at a temperature ranging from about 100° C. to about 250° C. or preferably from about 120° C. to about 170° C. for a time period ranging from about 1 to about 300 minutes. The carcass (also precured tread if used) being retreaded, having been previously been vulcanized, requires no additional vulcanization.

The present invention can be utilized to form a laminated retreaded tire for various types of vehicle tires such as passenger car tires, light and medium truck tires, off the road tires, and the like, and preferably is utilized in forming retreaded laminates for aircraft and medium truck tires.

Suitable tire tread compositions can be prepared by using conventional mixing techniques including, e.g., kneading, roller milling, extruder mixing, internal mixing (such as with a Banbury® mixing), etc. The sequence of mixing and temperatures employed are well known to skilled rubber compounders, the objective being the dispersion of fillers, activators, curatives in the polymer without excessive heat buildup.

The adhesive composition or cushion of the present invention in addition to forming retreaded tires, can generally be utilized whenever a good heat resistant, good blowout protection adhesive layer is required to bond two or more elastomeric layers together. The various layers can be uncured, cured, or combinations thereof. The various one or more elastomeric layers can generally be any elastomeric rubber composition such as those set forth with regard to the retreaded tires. However, in addition to the above noted rubbers, the various elastomeric layers can include various conventional rubbers know to the art and literature such as various nitrile rubbers, rubbers made from ethylene and propylene monomers, i.e., EPM rubber, various rubbers made from monomers of ethylene, propylene, and diene monomers, i.e., EPDM rubber, butyl rubber, neoprene rubber, and the like. Examples of other laminates which can utilized the adhesive cushion layer of the present invention include as an adhesive layer for a tire bead layer or an apex component, for conveyor belts, for lapping rubber layers together, and the like.

Figure 2:
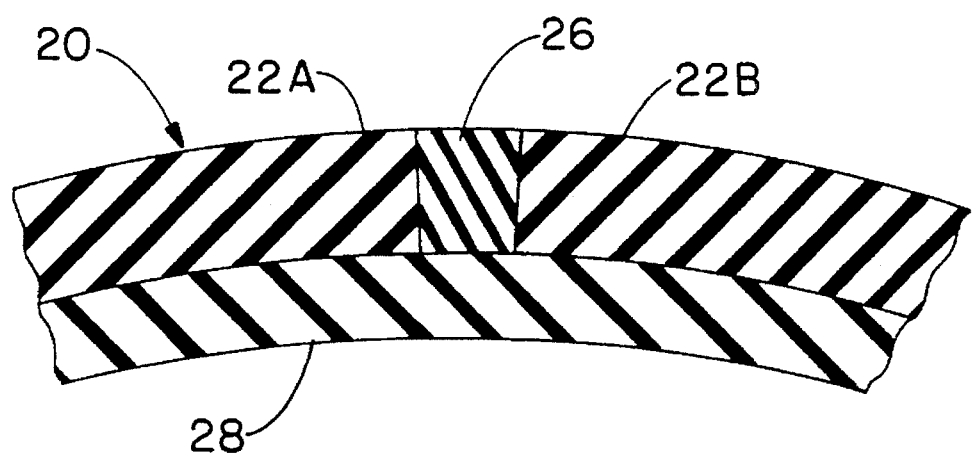
FIG. 2 is a schematic cross section of a tire tread spliced together using the elastomeric adhesive composition of the present invention.

Another suitable end use is as a tread splice adhesive or joint four adhering the ends of a tire tread to itself since it provides in the uncured stage excellent pressure Sensitive building tack as well as excellent adhesion after cure. Thus, as shown in FIG. 2, the spliced tire tread, e.g., uncured or cured, is generally indicated by the numeral 20 contains two ends of the tire tread 22a and 22b adhered to itself through tire splice material 26 which is the elastomeric adhesive composition of the present invention described herein above. The splice tread portion resides upon a tire ply or carcass substrate 28. Although not shown, carcass substrate 28 can be bonded, adhered, or joined to tire tread 22a or 22b through the use of a conventional adhesive or through the use of the elastomeric cushion adhesive of the present invention as discussed hereinabove and as illustrated in FIG. 1.

The elastomeric adhesive compositions of the present invention have superior blowout resistance when utilized as an adhesive tire cushion, as an adhesive tire splice, etc. In this regard, a suitable blowout test consists of subjecting a rubber specimen of suitable size and shape to rapidly oscillating compressive stresses under controlled conditions. The temperature of the sample is measured versus a set time required for fatigue failure of the sample by internal rupture or blowout. The specific blowout test utilized in the examples of the present invention is ASTMD-623. Another unexpected property of the solventless adhesive composition or cushion of the present invention is that it has long shelf life such as at least three months at ambient temperature or at cool temperatures of about 5° C.

The following examples serve to illustrate the invention in detail but do not limit the same thereto.

EXAMPLES

Two solventless adhesive compositions, Samples 1 through 4 were prepared by mixing the ingredients listed in Table I in a Banbury® mixer. In addition to the ingredients listed in Table I, Sample 2 also included 2 parts by weight of N,N'-m-xylylene biscitraconic imide (Perkalink® 900). Sample 3 in addition to the ingredients listed in Table I also contain 1 part by weight of N,N'-m-phenylene bismaleimide (HVA-2®). Similarly, sample 4 in addition the ingredients of Table I also include a one part by weight of 1,1'-(methylenedi- 4,1-phenylene) bismaleimide (BM). After the samples were mixed in the Banbury® mixer, they were passed through a two-roll mill and subsequently calendered into 40 mil sheets at 82° C. in a production four-roll gum calender.

In a typical procedure, the carcass of the used tire is buffed to provide a surface on which the cushion compound can be disposed. The cushion layer is directly applied thereto, that is, there is no intermediate layer and hence the present invention is free of any layer between the buff carcass and the cushion layer such as an adhesive layer, a rubber layer, or the like. Thereafter the uncured tread compound is applied onto the outer layer of the cushion compound. The completed tire assembly is subsequently inserted into a mold where the tread is embossed in the tread stock and the tread stock and cushion are vulcanized with heat and pressure.

TABLE I

CUSHION LAYER FORMULATION (PARTS BY WEIGHT):

60 polybutadiene rubber
40 natural rubber
50 carbon black
6.5 oil
3.0 zinc oxide
2.5 stabilizers
1.5 phenylenediamine type
1.0 octadecanoic acid
4.5 accelerators and curatives
0.8 sulfenamide type
0.2 diphenylguanidine
3.5 sulfur
8 phenolic resin as tackifier (reaction of formaldehyde with nonyl phenol)

TABLE II

| Rubber Composition | (Bis-imide) Parts by Weight | Blowout or Final Temperature (C.) | Blowout Time (minutes) |
|---|---|---|---|
| Sample 1 (control) | 0 | 218 | 10.5 |
| Sample 2 | 2 (Perkalink ® 900) | 171 | >60.0 |
| Sample 3 | 1 (HVA-2 ®) | 163 | >60.0 |
| Sample 4 | 1 (BM) | 143 | >60.0 |

From Table II it can be seen that with the addition of only 2 phr of the Perkalink® 900 in a 60/40 polybutadiene/natural rubber cushion, the blowout time was increased from 10.5 minutes to greater than 60 minutes. In addition, less heat is generated as the final temperature reached during the blowout experiment is reduced from 218° C. to 174° C. Similar improvements were obtained in samples 3 and 4.

A still further advantage realized through use of the 60/40 polybutadiene/natural rubber based elastomeric adhesive composition (cushion) of the invention is the fact that there is a significant improvement in the adhesion produced between the carcass and the tread stock compared to the 100 natural rubber based control cushion (see Table IV).

In an adhesion test, the buffed side of a cured carcass sheet, was wiped with solvent to remove powdered deposits and then dried. The cushion was applied to the carcass. To the cushion was applied as a 3×6 inch Mylar® separation sheet, followed by a 6×6×0.15 inch uncured tread. The sample was cured for 60 minutes at 150° C. and at 100 psi pressure in a bladder cure press. Strips of 1×6 inch were then cut and pulled apart parallel to the grain of the fabric at room temperature using an Instron tester at a cross-head speed of 2 inches per minute. The results are listed below in Table III.

TABLE III

| Adhesive Material | Cured Adhesion Values (lbs/inch) |
|---|---|
| 100% natural rubber based control cushion | 96 |
| 60/40 polybutadiene/natural rubber based cushion plus Perkalink ® 900 | 421 |
| 60/40 polybutadiene/natural rubber based cushion plus HVA-2 ® | 165 |

The elastomeric adhesive cushion of the present invention has superior cured adhesion values compared to the control cushion. The control cushion had to be used in combination with another solvent-based adhesive cement in order to improve adhesion values to acceptable standard values (150 lbs/in) as shown in Table IV.

TABLE IV

| Type of Tire | Cured Adhesion (lbs/inch) |
|---|---|
| Control (100% Natural Rubber-Based Cushion plus cement) | 195 |
| 60/40 Polybutadiene/Natural Rubber-Based Cushion with Perkalink ® 900 and without cement | 421 |

An additional advantage of the invention is that during the vulcanization procedure, the presence of the bis-imide appears to reduce the tendency of the cushion material to cause reversion of vulcanization in the cushion compound.

Table V relates to a comparison of a control using 100 percent natural rubber to a cushion of the present invention containing a bis-imide.

TABLE V

Comparison of 100% Natural Rubber Based Control Cushion vs. 60/40 Polybutadiene/Natural Rubber Based Cushion Containing Perkalink ® 900

| Property | Control 100% Natural Rubber | 60/40 Polybutadiene/ Natural Rubber Plus Perkalink ® 900 |
|---|---|---|
| Blowout (mins.) | 18 | >60 |
| Final Temp. (°C.) | 147 | 171 |

A cushion of the composition set forth in Table I was calendered into a smooth poly liner to a gauge of 0.050" and a width of a 9" in order to accommodate a 8.5" precured tread. A medium radial truck tire was built where this cushion was applied to the buffed carcass directly out of roll under tension followed by precured tread application. The tire was cured for 180 minutes at 127° C. Then the tire was cut and adhesion tests were performed using the Scott® tester. Average adhesion value was 141 lbs. per inch and it easily surpasses the minimum specification of 100 lbs. per inch.

Adhesion tests were repeated after the adhesive cushion in the roll was aged for three months at room temperature and in the refrigerator at 5° C.

As apparent from Table VII, the drop off in adhesion in room temperature cushion is considered to be very little and was even less in a refrigerator held constantly at 5° C. Such adhesion values were at least twice the specification even after three months, thus indicating its long shelf life.

TABLE VI

SHELF LIFE OF ADHESIVE CUSHION
(Based on Adhesion Values)

| Aging of Adhesive Cushion | Adhesion* (lbs/inch) |
|---|---|
| Fresh | 421 |
| 3 months at room temperature | 354 |
| 3 months in refrigerator | 391 |

*Military & civilian airplane tire spec: 150 lbs/inch

What is claimed is:

1. A retreaded tire assembly, comprising;

a concentric circular laminate including a cured carcass having an outer peripheral surface;

a concentric circular uncured adhesive cushion layer having an inner and outer peripheral surface, said inner peripheral surface of said cushion layer being adhered to said outer peripheral carcass surface, said adhesive cushion layer comprising a blend of at least one vulcanizable elastomer and a bis-imide compound of the formula

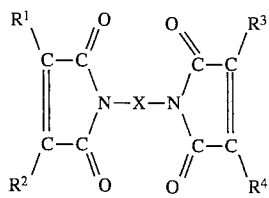

where $R^1$, $R^2$, $R^3$, and $R^4$, independently, are hydrogen, an alkyl group having from 1 to 5 carbon atoms, a phenyl group, an alkylphenyl group having 7 to 10 carbon atoms or a halogen substituted alkyl group having from 1 to 5 carbon atoms, a halogen substituted phenyl group, or a halogen substituted alkylphenylene group having a total of from 7 to 10 carbon atoms, and where X is an alkylene group having from 1 to 5 carbon atoms, a phenylene group, an alkylphenylene or alkylenephenyl group having 7 to 10 carbon atoms or a halogen substituted alkylene group having from 1 to 5 carbon atoms, a halogen substituted phenylene group, or a halogen substituted alkylphenylene or alkylenephenyl group having a total of from 7 to 10 carbon atoms, wherein the amount of said bis-imide compound is from about 0.1 to about 10 parts by weight per 100 parts by weight of said cushion vulcanizable elastomer, and a retread layer having an inner surface adhered to said outer peripheral surface of said cushion layer.

2. A retreaded tire assembly according to claim 1, wherein said bis-imide compound is N,N'-m-xylylene biscitraconic imide, N,N'-m-phenylene bismaleimide, 1,1'-(methylenedi-4,1-phenylene) bismaleimide, or combinations thereof, wherein the amount of said bis-imide compound is from about 0.3 to about 5 parts by weight per 100 parts by weight of said cushion vulcanizable elastomer, and wherein said elastomer is a blend of from about 20 to about 80 percent by weight of natural rubber and from about 80 to about 20 percent by weight of polybutadiene.

3. A retreaded tire assembly according to claim 1, including from about 1 to about 30 parts by weight of a tackifier per 100 parts by weight of said cushion vulcanizable elastomer.

4. A retreaded tire assembly according to claim 2, including from about 6 to 10 parts of a phenol-formaldehyde tackifier per 100 parts by weight of said cushion vulcanizable elastomer.

5. A spliced tire tread, comprising:

a tire tread having the ends thereof adhered together by an elastomeric adhesive composition, said tire tread residing upon a cured tire carcass, said elastomeric adhesive composition comprising a blend of at least one vulcanizable elastomer, a tackifier, and a bis-imide compound of the formula

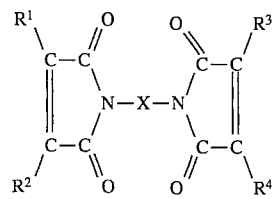

where $R^1$, $R^2$, $R^3$, and $R^4$, independently, are hydrogen, an alkyl group having from 1 to 5 carbon atoms, a phenyl group, an alkylphenyl group having 7 to 10 carbon atoms or a halogen substituted alkyl group having from 1 to 5 carbon atoms, a halogen substituted phenyl group, or a halogen substituted alkylphenyl group having a total of from 7 to 10 carbon atoms, and where X is an alkylene group having from 1 to 5 carbon atoms, a phenylene group, an alkylphenylene or alkylenephenyl group having 7 to 10 carbon atoms or a halogen substituted alkylene group having from 1 to 5 carbon atoms, a halogen substituted phenylene group, or a halogen substituted alkylphenylene or alkylenephenyl group having a total of from 7 to 10 carbon atoms.

6. A spliced tire tread according to claim 5, wherein said bis-imide compound is N,N'-m-xylylene biscitraconic imide, N,N'-m-phenylene bismaleimide, 1,1'-(methylenedi-4,1-phenylene) bismaleimide, or combinations thereof, and wherein the amount of bis-imide compound is from about 0.3 to about 10 parts by weight per 100 parts by weight of said vulcanizable elastomer, wherein said tackifier is a phenol-formaldehyde tackifier, wherein said tire carcass is cured and wherein said tire tread is cured.

7. An elastomeric laminate, comprising:

a first elastomeric layer, a second elastomeric layer, at least one of said elastomeric layers being cured, and an uncured adhesive cushion layer adhering said first elastomeric layer to said second elastomeric layer, said adhesive cushion layer comprising a rubber, from about 1 to about 30 parts by weight of a tackifier per 100 parts by weight of said rubber, and from about 0.1 to about 10 parts by weight of a bis-imide per 100 parts by weight of said rubber, said bis-imide having the formula $$\begin{array}{c} R^1 \\ \diagdown \\ C-C \\ \| \\ C-C \\ \diagup \\ R^2 \end{array} \begin{array}{c} O \\ \diagdown \\ \diagup \\ \diagdown \\ O \end{array} N-X-N \begin{array}{c} O \\ \diagup \\ \diagdown \\ \diagup \\ O \end{array} \begin{array}{c} R^3 \\ C-C \\ \| \\ C-C \\ \diagdown \\ R^4 \end{array}$$

where $R^1$, $R^2$, $R^3$, and $R^4$, independently, are hydrogen, an alkyl group having from 1 to 5 carbon atoms, a phenyl group, an alkylphenyl group having 7 to 10 carbon atoms or a halogen substituted alkyl group having from 1 to 5 carbon atoms, a halogen substituted phenyl group, or a halogen substituted alkylphenylene group having a total of from 7 to 10 carbon atoms, and where X is an alkylene group having from 1 to 5 carbon atoms, a phenylene group, an alkylphenylene or alkylenephenyl group having 7 to 10 carbon atoms or a halogen substituted alkylene group having from 1 to 5 carbon atoms, a halogen substituted phenylene group, or a halogen substituted alkylphenylene or alkylenephenyl group having a total of from 7 to 10 carbon atoms.

8. An elastomeric laminate according to claim 7, wherein said tackifier is a phenol-formaldehyde tackifier in the amount of from about 2 to about 15 parts by weight per 100 parts by weight of said rubber.

9. An elastomeric laminate according to claim 8, wherein said bis-imide compound is N,N'-m-xylylene biscitraconic imide, N,N'-m-phenylene bismaleimide, 1,1'-(methylenedi-4,1-phenylene) bismaleimide, or combinations thereof, wherein the amount of said bis-imide compound is from about 0.3 to about 5 parts by weight per 100 parts by weight of said rubber.

10. An elastomeric laminate according to claim 9, wherein said rubber is a blend of from about 20 to about 80 percent by weight of natural rubber and from about 80 to about 20 percent by weight of polybutadiene.

* * * * *